(No Model.)
A. WERTZ & J. H. FOGEL.
HORSE RAKE.
No. 267,292. Patented Nov. 7, 1882.
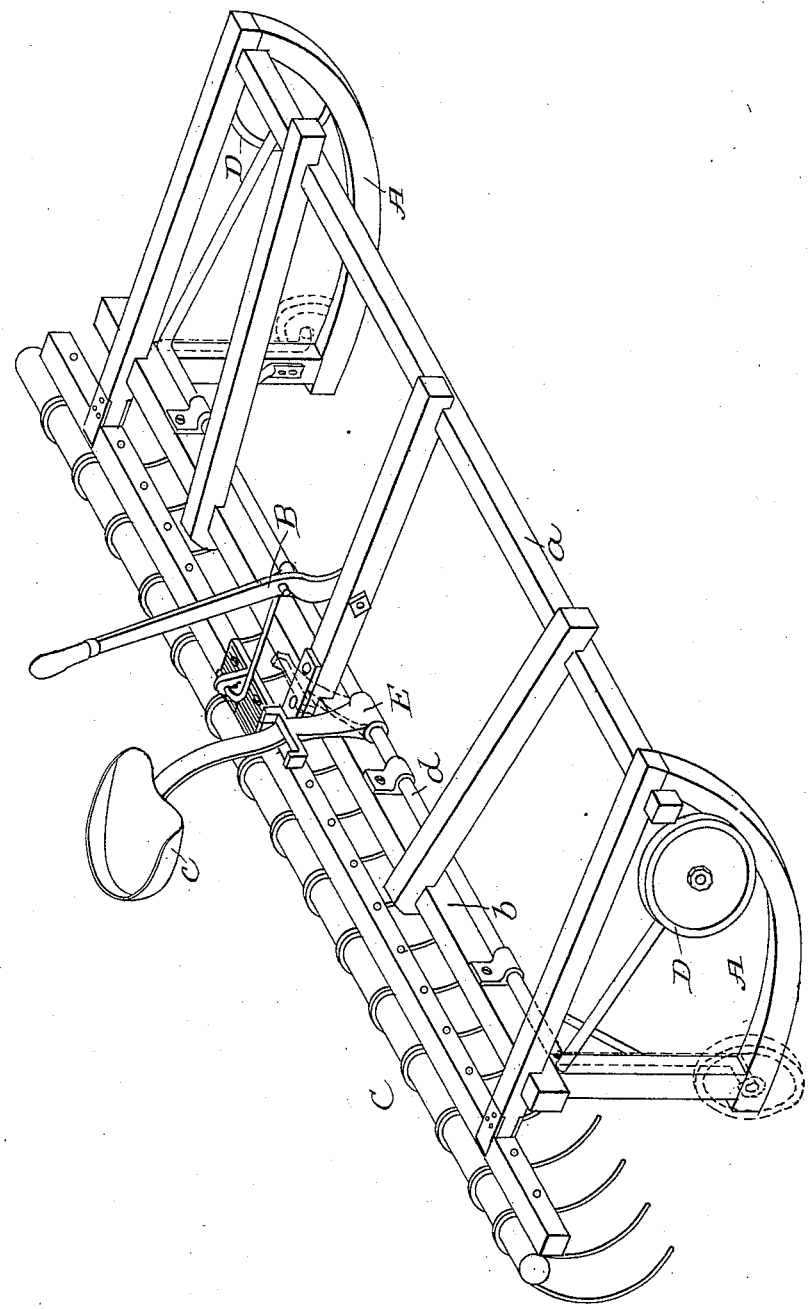

UNITED STATES PATENT OFFICE.

AMOS WERTZ AND JOSEPH H. FOGEL, OF MIDDLETOWN, IOWA.

HORSE-RAKE.

SPECIFICATION forming part of Letters Patent No. 267,292, dated November 7, 1882.

Application filed May 13, 1882. (No model.)

*To all whom it may concern:*

Be it known that we, AMOS WERTZ and JOSEPH H. FOGEL, citizens of the United States, residing at Middletown, Des Moines county, Iowa, have invented a new and useful Horse-Rake, of which the following is a specification.

Our invention relates to improvements in horse-rakes, which are set forth in the annexed drawing.

The object of our invention is to secure a rake that may be used in raking cornstalks, as well as hay in meadow or fallow land, and run with greater ease and lighter draft than the old-style horse-rakes.

The drawing represents the entire rake in perspective.

The rake consists of metal-shod wooden runners A, about five feet in length, joined together by two connecting-beams, $a$ and $b$, at front and back. Immediately at the back of the rear beam is the teeth-roller C, which is operated by a lever, B, at the seat $c$ on the rake. Beneath the rear beam, $b$, runs an iron bar with an elbow at either end, the short or lower arm of which extends to the top of the runners A, where it forms another elbow, on the short arms or spindles of which are wheels D D, which, when adjusted to use, extend below the runners A A. The iron bar $d$ is pivoted to the rear beam, $b$, and operated at the seat by means of the crank and lever E.

The operation of the machine is by means of the levers E and B. By manipulating lever B the teeth of the rake are adjusted as desired, this lever being made to operate with foot or hand. The lever E controls the adjustable pivoted wheels D D by means of its connection with the iron bar $d$, to which the wheels are attached.

This rake is used with one or two horses, and may be operated walking as well as riding. By means of the adjustable wheels it may be used in raking cornstalks equally with hay on sod or plowed ground. The wheels are used also in going on roads, in backing and turning, and in every instance where the runners are not practicable. The draft with runners is light on sod ground and with wheels in plowed.

What we claim by Letters Patent is—

In a horse-rake, the combination of the runners A A, the pivoted rake-bar C and its operating-lever, and the shaft $d$, journaled in bearings, and having the operating-lever E, said shaft being bent at right angles at both ends, and provided with carrying-wheels, as described.

AMOS WERTZ.
JOSEPH HENRY FOGEL.

Attest:
A. H. FULLER,
L. W. SEELY.